US006441928B1

(12) United States Patent
Tuli et al.

(10) Patent No.: US 6,441,928 B1
(45) Date of Patent: Aug. 27, 2002

(54) APPARATUS AND METHOD FOR READING A DOCUMENT USING A WAVEGUIDE FORMED IN A SUBSTRATE

(75) Inventors: Raja Tuli; Dimitrios Kakoulakis; Marian Iordan, all of Montreal (CA)

(73) Assignee: Docuport, Inc., Fairfield, NJ (US)

( * ) Notice: Subject to any disclaimer, the term of this patent is extended or adjusted under 35 U.S.C. 154(b) by 0 days.

(21) Appl. No.: 09/476,104

(22) Filed: Jan. 3, 2000

(51) Int. Cl.⁷ .......................... H04N 1/024; H04N 1/04
(52) U.S. Cl. ................... 358/473; 358/475; 358/483; 358/484
(58) Field of Search ......................... 358/484, 475, 358/473, 509, 483; 382/313; 250/227.31, 227.26, 235, 208.1; 362/223, 800

(56) References Cited

U.S. PATENT DOCUMENTS

| | | | | |
|---|---|---|---|---|
| 5,499,112 A | * | 3/1996 | Kawai et al. | 358/475 |
| 5,905,583 A | * | 5/1999 | Kawai et al. | 358/484 |
| 5,926,286 A | * | 7/1999 | Fujieda | 358/475 |
| 5,969,343 A | * | 10/1999 | Nakamura et al. | 250/227.31 |
| 6,127,675 A | * | 10/2000 | Nakamura et al. | 250/227.31 |

* cited by examiner

Primary Examiner—Cheukfan Lee

(57) ABSTRACT

The present invention relates to a hand-held scanner that comprises contact image scanning technology. A waveguide formed in a substrate is comprised of an elongate light pipe. The light pipe includes a reflective layer, preferably having an elliptical shape, deposited on an inside lateral surface. Light sources disposed at each end of the light pipe emit rays of light through the light pipe. The rays of light propagate in the light pipe until striking an area of a reflective surface. The reflective surface directs the ray of light away from the lateral surface and onto the scan line of a document to be scanned. The light of the illuminated scan line is reflected back through the waveguide array, through a slit not covered by the reflective layer, and onto an optical lens array. The optical lens array focuses the light onto an optical sensor array that converts the image into a digital image, to be saved in an internal memory. In a further embodiment, the hand-held scanner includes a mirrored surface, positioned at an angle, that directs the first path of the light of the illuminated scan line through an optical lens array. The optical lens array then focuses the light onto another mirrored surface, also positioned at an angle, which directs the light onto an optical sensor array, which converts the light into a digital image.

2 Claims, 4 Drawing Sheets

APPARATUS AND METHOD FOR READING A DOCUMENT USING A WAVEGUIDE FORMED IN A SUBSTRATE

BACKGROUND OF THE INVENTION

Generally, a contact-type reading apparatus comprises a contact glass, a linear array of light-emitting diodes (LEDs) that serves as an illumination source which sends rays of light through a light guide that focuses the light onto the surface of the document to be read. The LEDs and the light guide span the entire reading length reading apparatus. The illuminated portion of the document is reflected and focussed by an optic fiber lens array onto an optical sensor array. The optical sensor array consists of one or more solid state devices comprising multiple individual photo cells in a linear array, which convert the image focussed onto them into electrical signals, producing a digital image which can be stored in an internal memory for future use.

This kind of contact-type reading apparatus is not easily adaptable for use in a portable reading apparatus. The LEDs pose two problems. First, to evenly illuminate the document to be read, the LEDs must span the entire length of the reading apparatus. However, this arrangement is too cumbersome for a portable device. Second, the LEDs require considerable current to function, thus a substantial amount of battery power would be wasted on merely illuminating the LEDs, in a portable apparatus.

Another kind of contact-type scanner comprises a light pipe, or wave-guide, instead of a linear array of LEDs. The wave-guide includes a clear, glass or plastic pipe with an LED located at either end. The inside bottom surface of the pipe is painted white and as the LEDs discharge light through the pipe, the light is reflected by the white paint and the light is dispersed evenly in order to illuminate the document as it passes over the substrate. Then, the illuminated portion of the document is reflected and focussed by a lens array onto an optical sensor array.

SUMMARY OF THE INVENTION

It is an object of the present invention to disclose a hand-held scanner comprising contact image sensor scanning technology, and a waveguide formed in a substrate. The scanner is extremely lightweight and narrow in design because the bulkiness of a linear array of LEDs is eliminated, and is replaced with a waveguide that is formed in a substrate.

The length of the scanner is approximately equal to the width of a standard sheet of paper. The reading mechanisms are the long length of the unit such that the reading method comprises pressing the unit across a document to be read and manually moving the module in the direction desired.

The waveguide comprises a light pipe, which light pipe includes light sources disposed at either end, and a reflective cladding deposited on an inside lateral surface. The light sources emanate a plurality of light rays through the light pipe and which propagate in the light pipe until striking an area of the reflective layer. The light rays are directed away from the reflective layer and onto the scan line of the document. Light from the illuminated scan line is reflected back through the waveguide array and onto the optical lens array. The optical lens array then focuses the light onto an optical sensor array. The optical sensor array converts the image received into electrical signals to produce a digital image to be stored in an internal memory.

In another embodiment, light of the illuminated scan line is reflected back through the waveguide formed in a substrate and strikes a mirrored surface. The mirrored surface is positioned at an angle relative to the waveguide and directs the light from an illuminated scan line through an optical lens array. The optical lens array focuses the light onto another mirrored surface that is mounted at an angle. The mirrored surface reflects the light onto an optical sensor array, which convert the image into a digital image, to be stored in an internal memory.

BRIEF DESCRIPTION OF THE DRAWINGS

The invention is described in more detail below with respect to an illustrative embodiment shown in the accompanying drawings in which.

DETAILED DESCRIPTION OF THE PREFERRED EMBODIMENTS

The preferred embodiments will now be described with respect to the drawings. To facilitate description, any numeral identifying an element in one figure will represent the same element in any other figure.

The present invention relates generally to a hand-held scanner that comprises contact image scanning technology, and more particularly a waveguide formed in a substrate.

Briefly, the present invention constitutes a waveguide formed in a substrate positioned between a document to be scanned and an optic fiber lens array. Thus, a scan line of the document is in direct contact with, or in close proximity to, the waveguide. The combination of the waveguide and the substrate in one uniform configuration provides the invention with an extremely slim design. Furthermore, the waveguide being comprised of a light transmitting medium, for example an elongate light pipe, which light pipe includes light sources, such as LEDs, disposed at each end, eliminates the weight and bulk provided by a linear array of LEDs found in other contact image sensor scanners. Also, there is a reduction in battery power required. Thus, the waveguide formed in a substrate is a fundamental component in providing a compact and efficient hand-held scanner constructed according to the present invention.

The hand-held scanner is lightweight, and slim in design, so as to be easily manipulated and carried by a user. The length of the scanner is approximately equal to the width of a standard sheet of paper, i.e. 8½ inches; therefore the scanner is able to scan the entire width of a standard document. Scanning is initiated by the user placing the scanner flat across the document to be scanned and manually traversing it in the direction desired.

Figure 1:
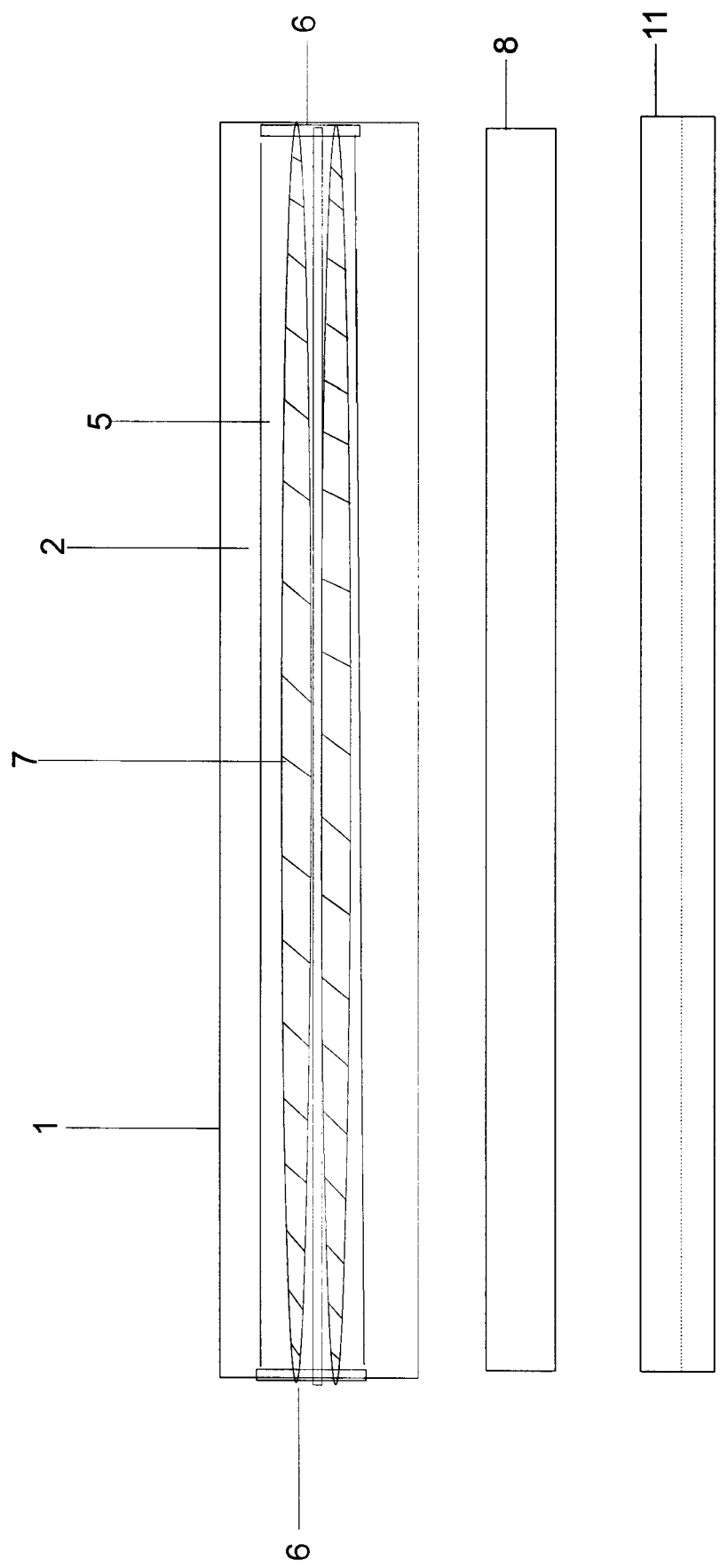
FIG. 1 illustrates a schematic view of the hand-held scanner.
Figure 2:
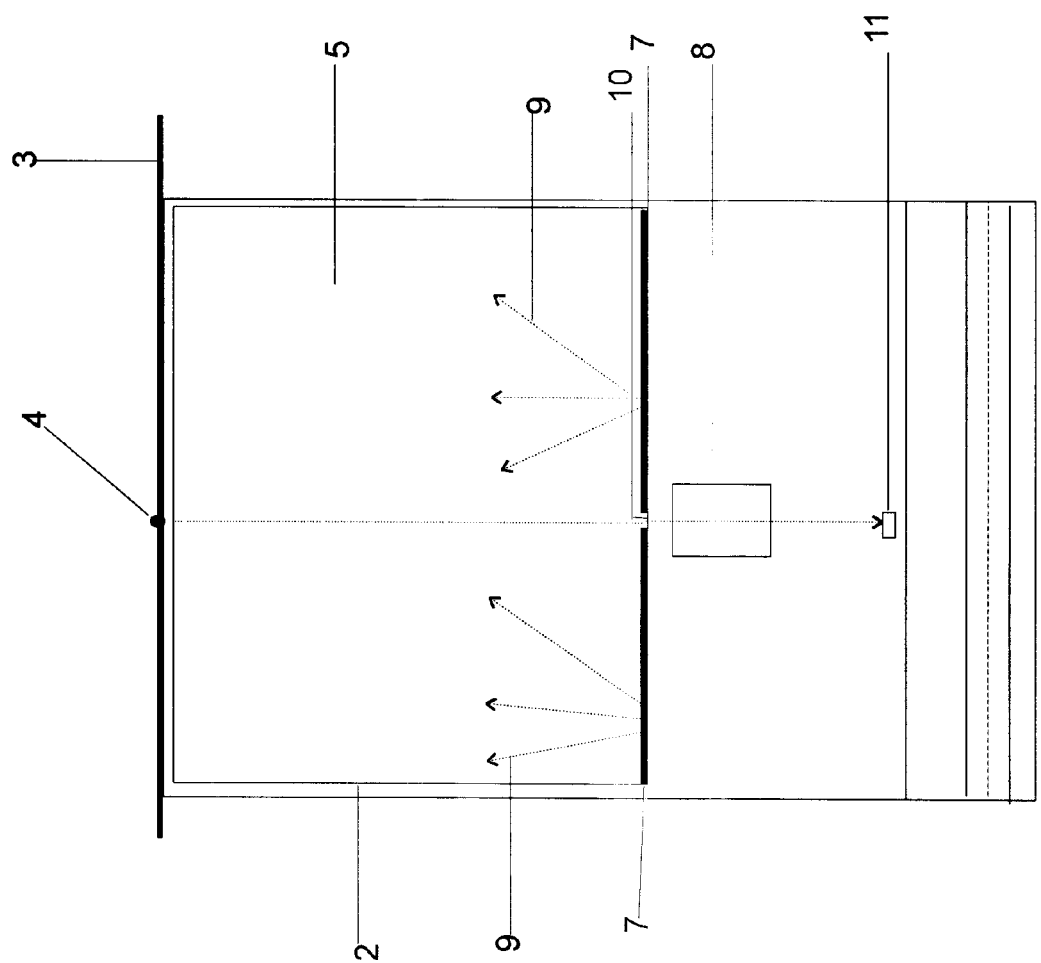
FIG. 2 illustrates a cross-sectional view of the hand-held scanner.

A preferred embodiment of the present invention is simultaneously illustrated in FIG. 1 and FIG. 2. FIG. 1 depicts a general overview of the hand-held scanner 1. FIG. 2 depicts a cross-sectional view of the scanner and includes a plurality of interior subassemblies.

Referring to FIG. 2, the waveguide 2 is formed in a substrate such that the waveguide is mounted between a document 3 to be scanned and an optic fiber lens array 8. Thus, a scan line 4 of the document to be scanned is in direct contact with, or in close proximity to the waveguide,.

The waveguide 2 (FIG. 1) is comprised of a light transmitting medium 5, preferably an elongate light pipe, which light pipe is composed of transparent plastic or glass. The light pipe includes light sources 6 (FIG. 1), such as light emitting diodes (LEDs), fixedly mounted at either end of the light pipe. The light pipe collects a plurality of light rays emitted from the light sources. The light pipe is configured so that substantially all of the light rays from the light sources are internally reflected and light travels across the light pipe.

An inside, lateral surface of the light pipe has a reflective cladding layer 7 (FIG. 1), which reflective layer is in direct contact with said surface. Preferably, the reflective layer comprises elliptical or triangular shapes and is further comprised of a white paint. The reflective layer covers a substantial area of the inside lateral surface of the light pipe. The light rays emitted from the light sources propagate in the light pipe until striking an area of the reflective layer. The reflective surface redirects the light rays out of the reflective surface of the light pipe and onto the scan line of the document to be scanned, thereby illuminating the scan line.

The reflective layer increases the efficiency of the light sources disposed at each end of the light pipe. The light rays emanated from the light sources are most intense at the ends of the light pipe. Thus, tapered ends of the reflective layer are positioned adjacent to the light sources, to reflect this higher intensity of light rays. Toward the center of the light pipe, where the light rays are less intense, are positioned the widest areas of the reflective layer. Generally, therefore, the reflective layer covers a wider area towards the center of the light pipe, as compared to the area directly adjacent to the ends of the light pipe where the reflective layer covers less area. Thus, intensity variations are eliminated and the light pipe achieves even illumination continuously along the width of the scan line.

To initiate scanning the user places the hand-held scanner flat across the width of the surface of the document to be scanned and manually traverses the scanner perpendicular to the scan line of the document. Referring to FIG. 2, a plurality of rays of light, emanated from the light sources, strike portions of the reflective layer 7 and the light rays 9 are reflected away from the reflective surface, towards the scan line 4 of the document. Light from the illuminated scan line of the document travels through a narrow, elongate slit 10 positioned between the reflective ellipses, and which is not covered by the reflective coating. Thus, the light from the illuminated scan line passes directly through the waveguide 2, and onto an optic fiber lens array 8.

The optic fiber lens array images the light onto an optical sensor array 11. The optical sensor array consists of one or more photoelements comprising multiple individual photocells in a linear array. The photo cells convert the image focussed onto them into electrical signals, producing a digital image which can be further processed to obtain a true representation of the image in a tangible form, or stored in an internal memory for future use. For example, the stored data may be downloaded into a computer or laptop. The photoelements are arranged along the length of the apparatus such that the entire length of a line of a page may be read and converted to a digital image.

The photo-cells are individually positioned equidistant from the waveguide such that their direction of arrangement is perpendicular to the scanner's direction of movement. The linear array of photoelements is capable of reading one line of information at a time restricted by the size, spacing and width spanned by the individual photocells in the linear array. Each line of information is read multiple times with 200 or 400 dpi but sent only once to a conventional microprocessor which assembles the image received in lines, and also perform image enhancement techniques to produce a true representation of the image or text being read. The array of photoelements read the lines of information continuously, to form a 2-D image.

The scanner is equipped with a battery (not shown). In that the apparatus is a hand-held unit, an internally disposed electrical power source, such as a battery, is required for desired operation. Conventional batteries tend to have short lives when used in hand-held scanners because of the amount of energy needed to power the numerous components. However, in the present invention because the waveguide uses a lower intensity light source, i.e. an LED located at each end, the light source requires less power.

Figure 3:
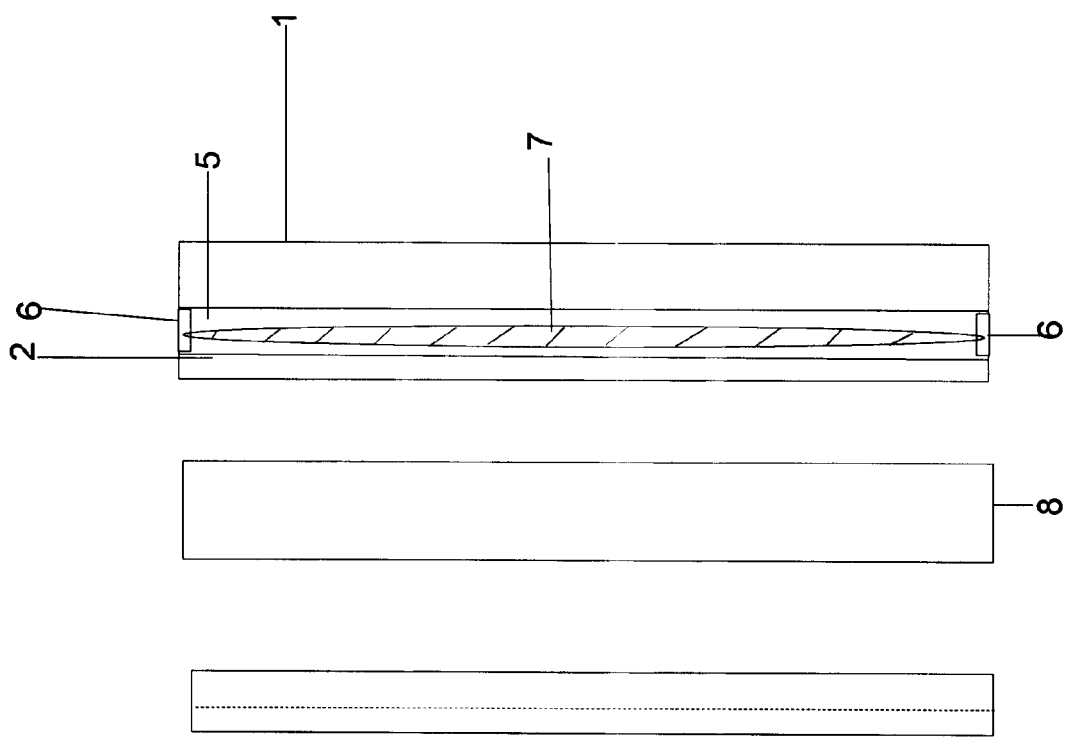
FIG. 3 illustrates a schematic view of the hand-held scanner.
Figure 4:
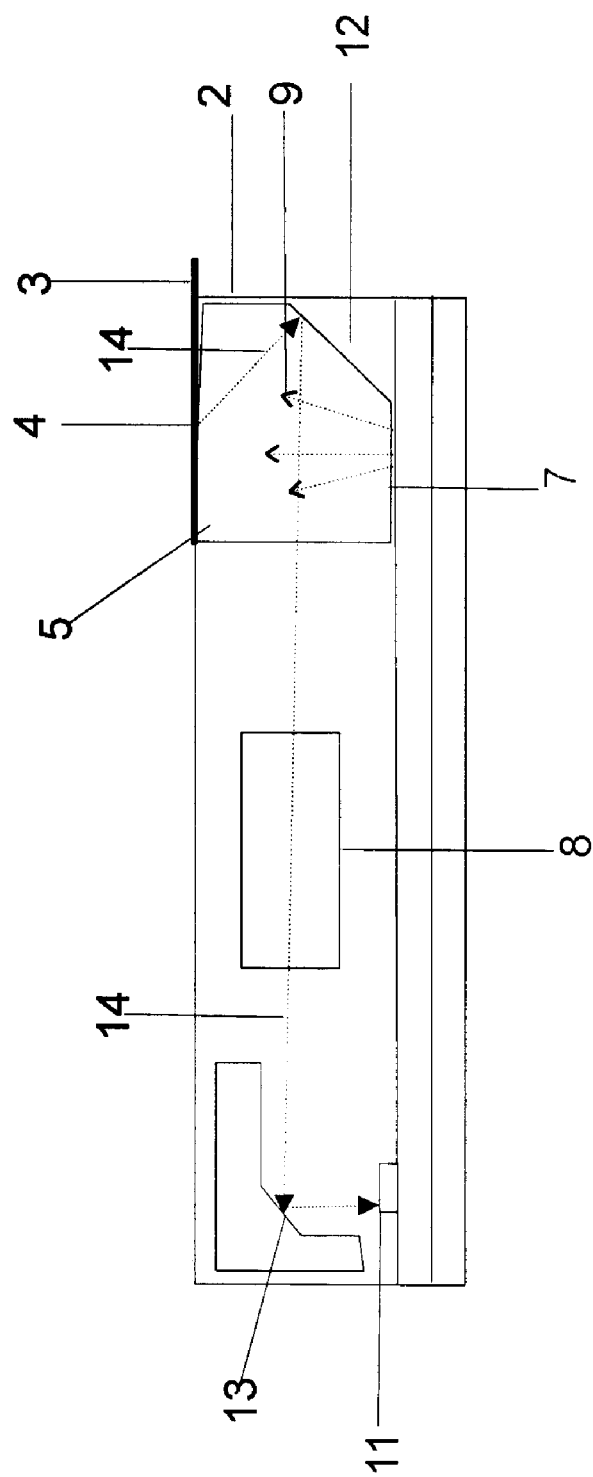
FIG. 4 illustrates a cross-sectional view of the hand-held scanner with mirrored surfaces.

An alternate embodiment of the present invention is illustrated in FIG. 3 and FIG. 4 concurrently. Referring to FIG. 3, the hand-held scanner 1 is illustrated. The scanner comprises a waveguide 2 formed in a substrate.

The waveguide comprises an elongate light pipe 5, which light pipe is comprised of a transparent plastic or glass. The light pipe further includes a reflective cladding layer 7 deposited on an inside lateral surface. Preferably, the reflective layer has an elliptical shape and is comprised of white paint. Generally, the reflective layer covers a wider area towards the center of the light pipe, as compared to the area directly adjacent to the ends of the light pipe where the reflective layer covers less area. Light sources 6, such as LEDs, are positioned at opposite ends of the light pipe.

The light sources emit a plurality of light rays through the light pipe. The light rays propagate in the light pipe until striking an area of the reflective surface. The reflective layer disperses the light rays emanated by light sources onto a scan line of the document to be scanned. As previously explained, the elliptical shape of the reflective layer uniformly disperses the light rays from the light sources, along the scan line.

Referring to FIG. 4, a cross-sectional view of the hand-held scanner is depicted. The waveguide 2 further comprises a mirrored surface 12. The mirrored surface is fixedly mounted at an angle relative to the plane of the waveguide.

Scanning is initiated by the user placing the hand-held scanner flat across the width of the surface of the document 3 to be scanned and manually traversing the scanner perpendicular to the scan line of the document. A plurality of rays of light, emanated from the light sources, propagate in the light pipe until striking portions of the reflective layer 7. The reflective layer reflects the light rays 9 away from the reflective surface, towards the scan line 4 of the document. The light of the illuminated scan line of the document reflects directly back through the waveguide, through an area not covered by the reflective layer. The mirrored surface 12 is positioned such that a first path 14 of the light of the illuminated scan line strikes the mirrored surface. The mirrored surface defines the first path of the light reflected by the illuminated scan line of the document. The mirrored surface subsequently directs the path of the light through an optic fiber lens array 8.

The optic fiber lens array directs the light of the illuminated scan line onto a second mirrored surface 13. The second mirrored surface is fixedly positioned at an angle relative to the optic fiber lens array, and directs the light of the illuminated scan line onto a linear photosensor array 11. The linear photosensor array is mounted underneath the mirrored surface and comprises a plurality of multiple photo cells arranged in a linear array. The photo cells convert the image into electrical signals, to produce a digital image light received is converted into a digital image which can be further processed to obtain a true representation of the image in a tangible form, or stored in an internal memory for future use.

The invention has been described in detail with particular reference to the preferred embodiments thereof, but it will be understood that variations and modifications can be effected within the spirit and scope of the invention.

I claim:

1. An apparatus for scanning a document, comprising:
    a waveguide formed in a substrate, such that the document to be scanned passes directly over said waveguide;
    said waveguide comprising an elongate light pipe, which light pipe includes a reflective layer which evenly disperses a plurality of light rays emitted from light sources disposed at either end of the light pipe;
    wherein an image of an illuminated portion of the document passes through said waveguide to be imaged.

2. An apparatus for reading a document, as claimed in claim 1, wherein the light pipe further includes a mirrored surface positioned at an angle, light from an illuminated portion of the document passes through said waveguide and strikes the mirrored surface, and the mirrored surface directs the light to be imaged.

* * * * *